J. B. BUNTEN.
HARROW CART.
APPLICATION FILED AUG. 6, 1910.
996,747.
Patented July 4, 1911.
2 SHEETS—SHEET 2.
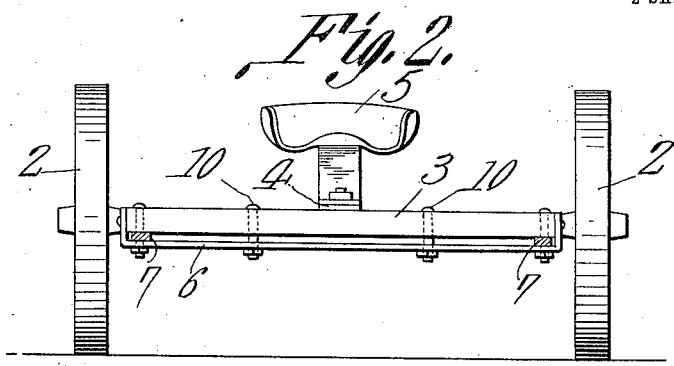
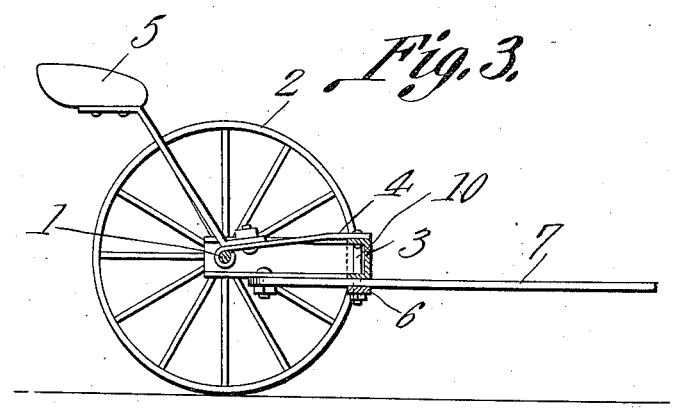
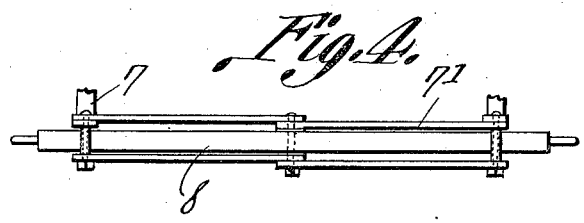
Witnesses
John B. Bunten
Inventor
by C. A. Snow & Co.
Attorneys

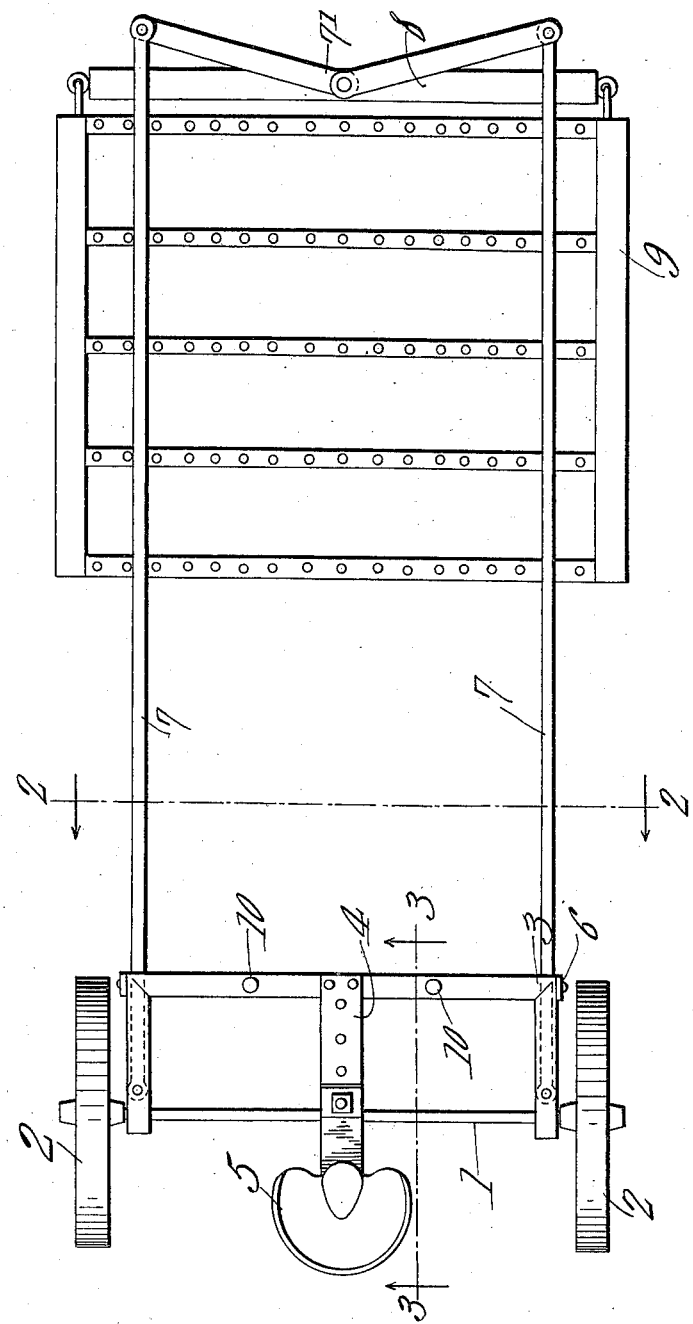

UNITED STATES PATENT OFFICE.

JOHN B. BUNTEN, OF MOUNT AUBURN, IOWA.

HARROW-CART.

996,747.

Specification of Letters Patent. Patented July 4, 1911.

Application filed August 6, 1910. Serial No. 575,934.

*To all whom it may concern:*

Be it known that I, JOHN B. BUNTEN, a citizen of the United States, residing at Mount Auburn, in the county of Benton and State of Iowa, have invented a new and useful Harrow-Cart, of which the following is a specification.

This invention relates to an improvement in harrow carts and consists in the novel construction and arrangement of its parts as hereinafter shown and described.

The object of the invention is to provide an attachment for a harrow which is adapted to support an operator who is so positioned upon the attachment as to balance or practically balance the parts upon the supporting wheels.

With the above object in view the cart includes an axle supported by means of ground wheels and journaled in a frame. An operator's seat is adjustably mounted upon the frame. Draft arms are pivotally connected at their rear ends with the side portions of the frame, and are pivotally connected at their forward ends with links which in turn are pivotally connected with the draft bar of a harrow.

In the accompanying drawings:—Figure 1 is a top plan view of the draft cart applied to a harrow. Fig. 2 is a transverse sectional view of the harrow cart cut on the line 2—2 of Fig. 1. Fig. 3 is a sectional view of the harrow cart cut on the line 3—3 of Fig. 1. Fig. 4 is a front elevation of the draft bar of the harrow and attached parts.

The cart consists of an axle 1 which is supported at its ends upon ground wheels 2. The axle 1 is journaled in a frame 3 which is approximately U shaped and preferably formed from channel iron. A plate 4 forms a portion of the frame 3 and is provided at its rear end with a bearing which receives the intermediate portion of the axle 1. A seat 5 is adjustably mounted upon the plate 4 and is so positioned that when occupied the weight of the occupant approximately balances the forward portion of the harrow cart upon the axle 1 and the supporting wheels 2. A guide strip 6 is secured at its ends to the side portions of the frame 3 and the intermediate portion of the said strip lies under the intermediate portion of the said frame and is spaced from the same. Arms 7 are pivotally connected at their rear ends with the side portions of the frame 3. At their forward ends the arms 7 are pivotally connected by means of pivoted links 7' with a draft bar 8 which in turn is connected with a harrow section 9.

The links 7' are arranged in pairs, the inner ends of which are pivotally connected together and pivotally connected to the draft bar 8. Of each pair of links 7' one member is located above the draft bar 8 and the other member is located below the same as illustrated in Fig. 4 of the drawing. The outer end portions of the members of the pair of links 7' are connected together by a pivot bolt which also serves as means for connecting the forward ends of the arms 7 with the outer ends of the said links 7'. The last mentioned pivot bolt extends transversely across the forward edge of the draft bar 8 and when draft is applied to the said bar the said pivot bolts are adapted to engage the forward edge of the bar and limit the rearward swinging movement of the outer end portions of the links 7'.

From the above description it will be seen that when draft is applied to the bar 8 and the said bar together with the harrow section 9 is moved in a straight forward direction, the frame 3 and the axle 1 and supporting wheels 2 will trail behind the harrow section, but when a turn is made and the draft bar 8 is swung to one side or the other the arms 7 are moved longitudinally with relation to each other and the axle 1 is turned so that the wheels 2 will continue to trail behind the harrow section 9 and the harrow section may be turned around in a comparatively small space. The intermediate portion of the frame 3 is connected with the intermediate portion of the guide strip 6 by means of bolts 10 which are located at the opposite sides of the plate 4 and limit the swinging movement of the frame 3 and also prevent the arm 7 from coming in contact with the bolts which secure the plate 4 to the said frame 3.

Having described the invention what I claim as new and desire to secure by Letters Patent is:—

1. In combination with a draft bar, a cart comprising an axle, wheels supporting the same, a frame having bearings in which the axle is journaled, a guide strip secured at each end to the sides of the frame and at its intermediate portion spaced from the lower intermediate portion of the frame, and arms pivotally connected at their forward ends with the draft bar and pivotally connected at their rear ends with the side portions of the frame and lying in the space between the guides and the frame.

2. In combination with a draft bar, a cart comprising an axle, wheels supporting the same, an approximately U shaped frame having bearings in which the said axle is journaled, a plate connected at its forward end with the frame and having at its rear portion a bearing which receives the axle, an operator's seat adjustably mounted upon the plate, a strip secured at its ends to the sides of the frame and having its intermediate portion spaced from the intermediate portion of the frame, arms pivotally connected at their forward end with the draft and extending through the space between the frame and the strip and pivotally connected at their rear ends with the sides of the frame.

In testimony that I claim the foregoing as my own, I have hereto affixed my signature in the presence of two witnesses.

JOHN B. BUNTEN.

Witnesses:
W. H. TRACY,
M. W. BROLFFLE.

Copies of this patent may be obtained for five cents each, by addressing the "Commissioner of Patents. Washington, D. C."